United States Patent [19]

Finan

[11] Patent Number: 4,541,834

[45] Date of Patent: Sep. 17, 1985

[54] PEAT EXTRUSION APPARATUS

[75] Inventor: Michael Finan, Ballintubber, Ireland

[73] Assignee: Ballintubber Enterprises Limited, Ireland

[21] Appl. No.: 547,541

[22] Filed: Oct. 31, 1983

[30] Foreign Application Priority Data

Nov. 2, 1982 [IE] Ireland ................................ 2615/82

[51] Int. Cl.[4] .......................... E21C 49/00; B29F 3/04

[52] U.S. Cl. .............................................. 44/30; 37/3

[58] Field of Search ...................................... 44/28-31, 44/13; 37/3

[56] References Cited

U.S. PATENT DOCUMENTS 1,378,775 5/1921 Farrow .................................. 44/28

FOREIGN PATENT DOCUMENTS 0480508 2/1938 United Kingdom .
606397 8/1948 United Kingdom .................... 44/30
0926272 5/1963 United Kingdom .
1061272 3/1967 United Kingdom .
1183445 3/1970 United Kingdom .
1183444 3/1970 United Kingdom .
2061137 5/1981 United Kingdom .

*Primary Examiner*—Carl F. Dees
*Attorney, Agent, or Firm*—Pollock, Vande Sande & Priddy

[57] ABSTRACT

The invention provides an outlet for a peat extrusion press, the outlet comprising a pair of jaws which in the closed position thereof co-operate to define a number of side-by-side extrusion pipes and in the open position define, in place of the pipes, an unrestricted outlet. If the extrusion pipes become clogged during operation, the jaws are opened to release whatever is causing the clogging, and are then closed.

10 Claims, 10 Drawing Figures

Fig. 4a.
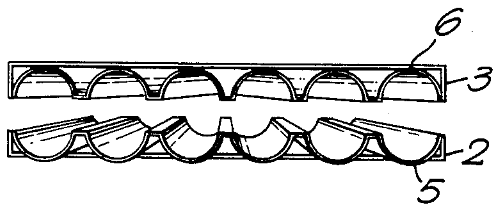
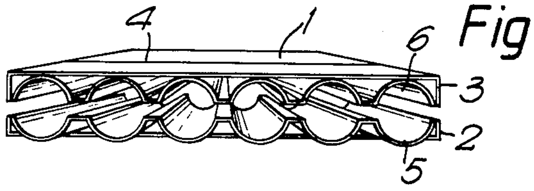
Fig. 4b.
Fig. 4c.
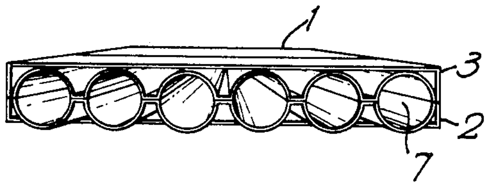
Fig. 5a.
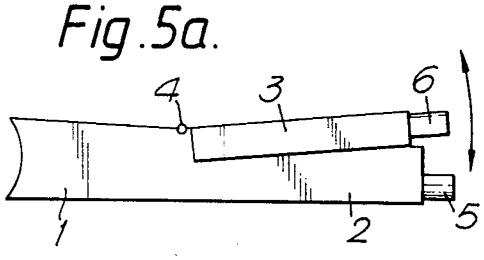
Fig. 5b.
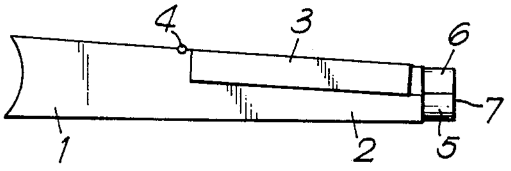
Fig. 6.
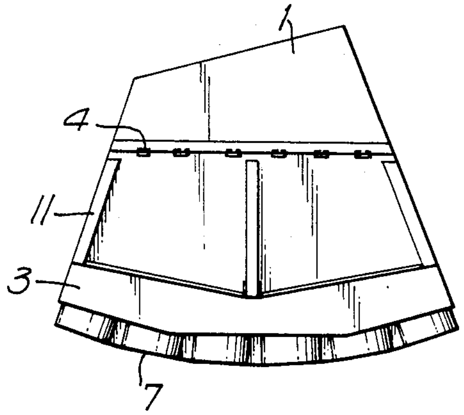

PEAT EXTRUSION APPARATUS

The present invention relates to peat cutting apparatus.

Known peat cutting apparatus has an extrusion press from which the peat can be extruded through a series of extrusion pipes, the peat cutting apparatus in operation cutting and collecting peat while moving continuously across a bog, and the cut peat being continuously extruded through the extrusion pipes, to lie on the bog surface.

The extrusion pipes may occasionally become blocked. Such blockages may, for example, occur when a foreign body (such as a branch, a stone, or a piece of rubbish) passing through the extrusion press is pushed towards the blind region between the entrances to two extrusion pipes. The foreign body cannot be extruded through either pipe and ends up straddling both. Peat then accumulates behind the foreign body, eventually blocking the entrances to both pipes. It is then necessary to discontinue the operation of the peat cutting apparatus until the blockage has been cleared, and in the known apparatus, it is difficult to gain access to the blocked regions and therefore time consuming to clear the blockage. An object of the present invention is to provide an extrusion press which, if it becomes blocked, can rapidly be cleared.

The present invention provides an outlet for a peat extrusion press, the outlet comprising a pair of jaws which in the closed position thereof co-operate to define at least one peat extrusion pipe, and which in the open position thereof define, in place of the extrusion pipe or pipes, an unrestricted opening and jaw operating means for opening and closing the jaws during operation of the peat extrusion press, enabling the pipe or any pipe which has become clogged to be cleared by pressure of peat being extruded by the press.

Advantageously, the two jaws comprise a lower jaw and an upper jaw pivotally connected to one another for relative pivotal movement between the closed and open positions.

Advantageously, the two jaws, in their closed position, define a plurality, for example six, of side-by-side pipes, the upper jaw defining the upper half of each pipe and the lower jaw defining the lower half of each pipe.

Advantageously, the jaw operating means comprises one or more hydraulic rams operable by remote control. The outlet may be provided with a gantry mounted on the lower jaw and extending above the upper jaw, with each hydraulic ram being connected between the gantry and the upper jaw.

The invention will now be described in more detail, by way of examply only, with reference to the accompanying drawings. In the drawings:

FIGS. 1*a* and 1*b* are perspective views of an outlet attached to a peat extrusion press, with the jaws, respectively, open and closed;

Figure 1A:
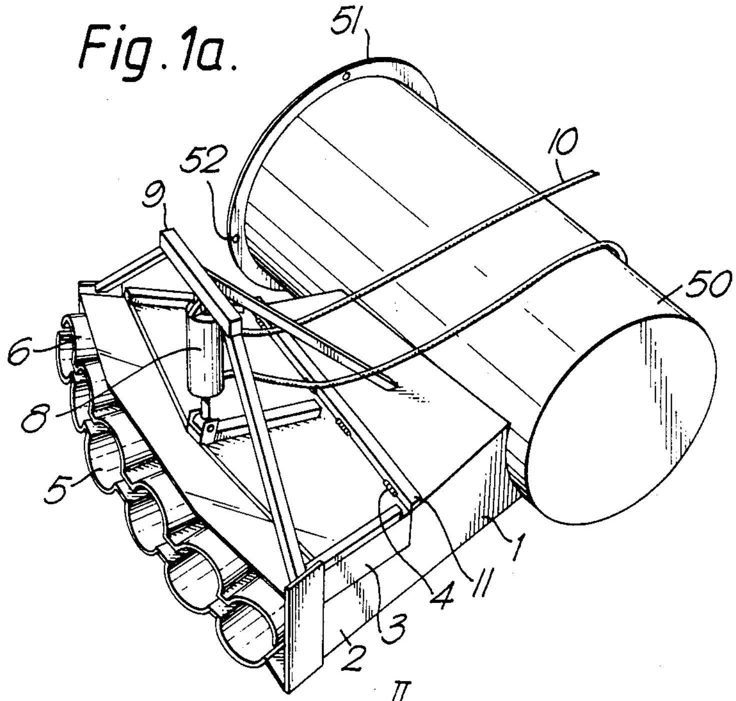

FIGS 4*a,* 4*b* and 4*c* are front end views of the outlet with the jaws, respectively, open, partially closed and fully closed;

FIGS. 5*a* and 5*b* are side views of the outlet with the jaws, respectively, open and closed; and FIG. 6 is a plan view of the outlet.

In FIGS. 3 to 6 inclusive, certain components have been omitted for clarity.

Referring to the drawings, the outlet comprises a housing 1 attached to an extrusion press 50 and defining a peat chamber which communicates with the interior of the press 50; a lower jaw 2 integrally formed with the housing 1; and an upper jaw 3 hinged to the housing 1 by means of hinges 4. The lower jaw 2 is provided with six side-by-side lower halves 5 of pipes, and the upper jaw 3 is provided with corresponding upper halves 6 of pipes. The jaws are mounted horizontally.

The extrusion press 50 has at one end thereof a flange 51 having bolt holes 52 for receiving bolts (not shown) for securing the press to the remainder of the peat cutting apparatus. The extrusion press 50 is mounted at an angle to the horizontal, the flanged end being higher than the closed end.

Figure 1B:
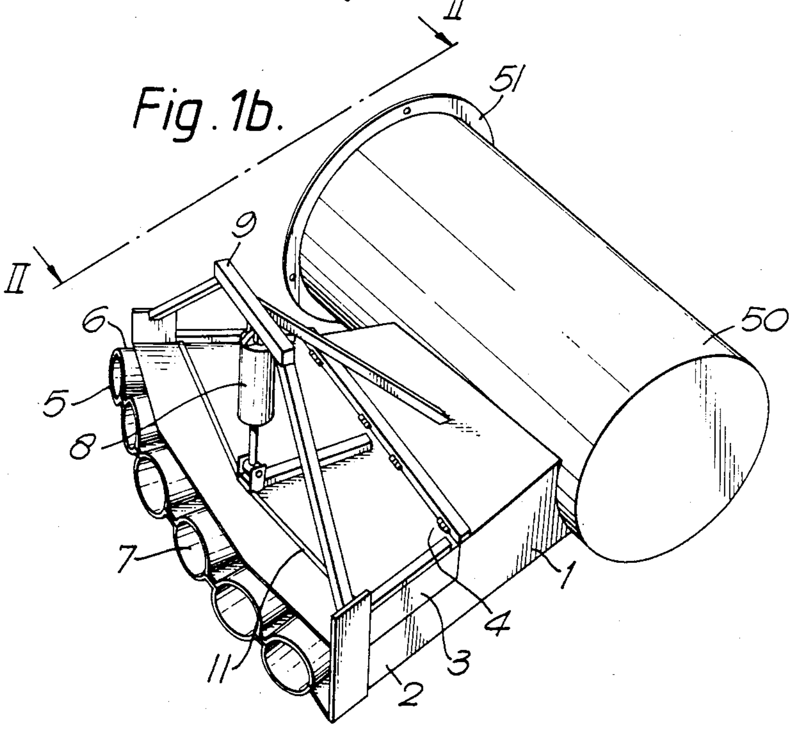
Figure 2:
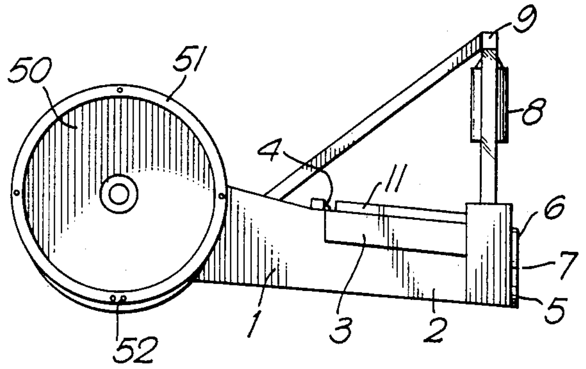
FIG. 2 is a side view in the direction of horizontal arrows II—II of FIG. 1*b;*
Figure 3:
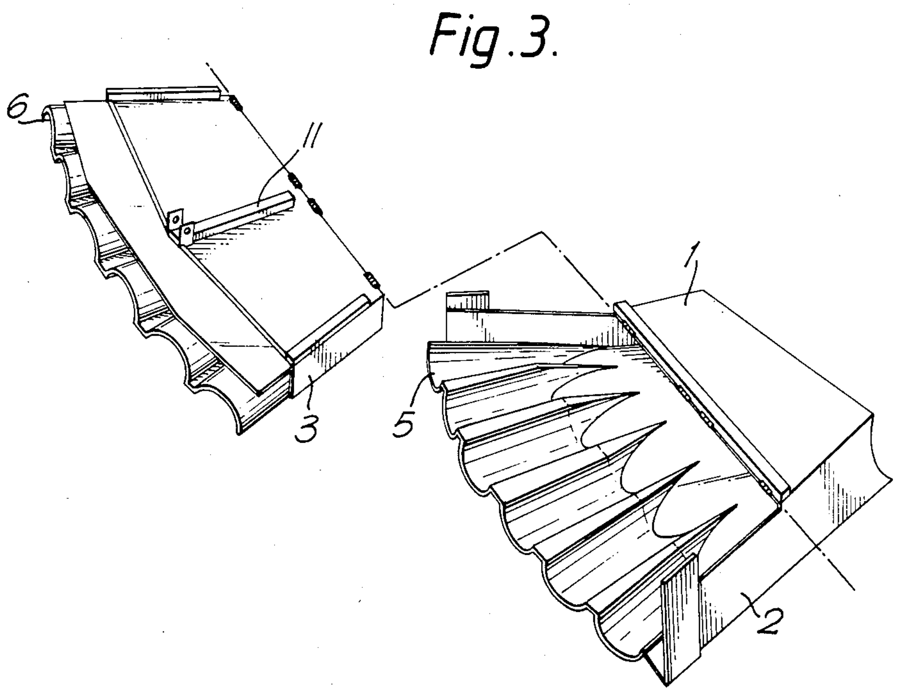
FIG. 3 is an exploded perspective view showing the upper and lower jaws defining the outlet.

In normal operation, the jaws 2,3 remain closed, as shown in FIG. 1*b,* the lower halves 5 and upper halves 6 of the pipes co-operating with one another to form a series of six parallel side-by-side extrusion pipes 7 the axes of which are co-planar. Peat from the extrusion press is pushed through the peat chamber and is continuously extruded through the pipes to form parallel extrusions of circular cross section on the surface of the bog.

Should the pipes 7 become clogged during operation of the apparatus, the jaws 2,3 are opened while the operation of cutting, collecting, and extruding peat is continued. With the jaws 2,3 open, the foreign body causing the obstruction is pushed out by the peat being extruded, and the jaws 2,3 are then closed again and normal operation is continued.

Opening and closing of the jaws 2,3 is effected by means of a hydraulic ram 8. One end of the ram 8 is pivotally connected to the top of the upper jaw 3. The other end of the ram 8 is pivotally connected to a gantry 9 which is supported on the lower jaw 2 and on the housing 1 and extends above the upper jaw 3. The ram hydraulic hoses 10 are connected to the hydraulic system of the prime mover (not shown). Thus the jaws 2,3 may be opened and closed by remote control from the cabin of the prime mover.

To prevent the jaws 2,3 being damaged by closing over a hard foreign body such as a stone, the ram 8 is provided with a pressure release valve (not shown) which operates automatically if an obstacle is encountered. The upper jaw 3 is also provided with reinforcing bars 11.

I claim:

1. An outlet for a peat extrusion press comprising a pair of jaws which in the closed position thereof cooperate to define at least one peat extrusion pipe and which in the open position thereof define an unrestricted opening and jaw operating means for opening and closing the jaws during operation of the peat extrusion press, enabling the pipe or any pipe which has been clogged to be cleared by opening the jaws, whereby clogging material is removed by pressure of peat being pushed from the press.

2. An outlet as claimed in claim 1 in which the two jaws are pivotally connected to one another for relative pivotal movement between the closed and open positions.

3. An outlet as claimed in claim 2, comprising a lower jaw fixed relative to the extrusion press and an upper jaw moveable relative to the lower jaw.

4. An outlet as claimed in claim 3 in which the jaws, when closed, define a plurality of side-by-side pipes.

5. An outlet as claimed in claim 4, in which the upper jaw defines the upper half of each pipe and the lower jaw defines the lower half of each pipe.

6. An outlet as claimed in claim 1 in which the jaw operating means comprise one or more hydraulic rams.

7. An outlet as claimed in claim 6, provided with a gantry fixed relative to a lower jaw and extending above an upper jaw, with each hydraulic ram being connected between the gantry and the upper jaw.

8. An outlet as claimed in claim 7, provided with a single hydraulic ram, connected between the centre of the gantry and the centreline of the upper jaw.

9. An outlet as claimed in claim 6, in which the or each hydraulic ram is provided with a pressure release valve to prevent the jaws being damaged.

10. Peat cutting apparatus having an extrusion press provided with an outlet as claimed in any one of the preceding claims.

* * * * *